(12) United States Patent
Liljeroos et al.

(10) Patent No.: US 11,386,608 B2
(45) Date of Patent: Jul. 12, 2022

(54) MODIFYING A POSITION OF A CONFLICTING OBJECT IN A RENDERED VIRTUAL SCENE

(71) Applicant: Nokia Technologies Oy, Espoo (FI)

(72) Inventors: Ari-Pekka Liljeroos, Pirkkala (FI); Arto Lehtiniemi, Lempaala (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/979,794

(22) PCT Filed: Feb. 20, 2019

(86) PCT No.: PCT/EP2019/054195
§ 371 (c)(1),
(2) Date: Sep. 10, 2020

(87) PCT Pub. No.: WO2019/174878
PCT Pub. Date: Sep. 19, 2019

(65) Prior Publication Data
US 2021/0042990 A1 Feb. 11, 2021

(30) Foreign Application Priority Data
Mar. 12, 2018 (EP) .................................... 18161323

(51) Int. Cl.
*G06T 15/20* (2011.01)
*G06F 3/01* (2006.01)
(52) U.S. Cl.
CPC .............. *G06T 15/20* (2013.01); *G06F 3/013* (2013.01)

(58) Field of Classification Search
CPC ...................................................... G06T 15/20
(Continued)

(56) References Cited

U.S. PATENT DOCUMENTS 8,395,656 B1 3/2013 Malzbender et al.
2013/0335301 A1 12/2013 Wong et al.
(Continued)

FOREIGN PATENT DOCUMENTS

EP 3040893 A1 7/2016
EP 3404510 A1 11/2018

OTHER PUBLICATIONS

Victoria Ivleva: "Redirected Walking in Virtual Reality during eye blinking", Jan. 1, 2016 (Year: 2016).*
(Continued)

*Primary Examiner* — Shivang I Patel
(74) *Attorney, Agent, or Firm* — Alston & Bird LLP

(57) ABSTRACT

An apparatus, method and computer program is disclosed, comprising rendering a virtual scene of a virtual space that corresponds to a virtual position of a user in the virtual space as determined at least in part by the position of the user in a physical space. Embodiments also involve identifying one or more objects in the virtual scene which are in conflict with attributes of the physical space. Embodiments also involve detecting one or more blinking periods of the user when consuming the virtual scene. Embodiments also involve modifying the position of the one or more conflicting objects in the virtual scene based on a detected context. The modifying may be performed within the one or more detected blinking periods.

11 Claims, 7 Drawing Sheets

(58) Field of Classification Search
USPC .......................................................... 345/419
See application file for complete search history.

(56) References Cited

U.S. PATENT DOCUMENTS

2017/0178408 A1    6/2017  Bavor, Jr. et al.
2019/0051051 A1*   2/2019  Kaufman ................. G06F 3/01

OTHER PUBLICATIONS

F. Steinicke and G. Bruder, "Using Perceptual Illusions for Redirected Walking," in IEEE Computer Graphics and Applications, vol. 33, No. 1, pp. 6-11, Jan.-Feb. 2013, doi: 10.1109/MCG.2013.13 (Year: 2013).*

Extended European Search Report received for corresponding European Patent Application No. 18161323.3, dated Aug. 7, 2018, 10 pages.

Ivleva, "Redirected Walking in Virtual Reality during eye blinking", Thesis, 2016, 113 pages.

Steinicke et al., "Using Perceptual Illusions for Redirected Walking", IEEE Computer Graphics and Applications, vol. 33, No. 1, Jan.-Feb. 2013, pp. 6-11.

Nilsson et al., "15 Years of Research on Redirected Walking in Immersive Virtual Environments", IEEE Computer Graphics and Applications, vol. 38, No. 2, Mar./Apr. 2018, pp. 44-56.

Bolte et al., "Subliminal Reorientation and Repositioning in Immersive Virtual Environments using Saccadic Suppression", IEEE Transactions on Visualization and Computer Graphics, vol. 21, No. 4, Apr. 18, 2015, pp. 545-552.

Suma et al., "Leveraging Change Blindness for Redirection in Virtual Environments", IEEE Virtual Reality Conference, Mar. 19-23, 2011, pp. 159-166.

International Search Report and Written Opinion received for corresponding Patent Cooperation Treaty Application No. PCT/EP2019/054195, dated May 13, 2019, 14 pages.

Office action received for corresponding European Patent Application No. 18161323.3, dated Feb. 17, 2020, 11 pages.

"IT Specialist—BMW Group", Linkedin, Retrieved on Feb. 10, 2020, Webpage available at: https://de.linkedin.com/in/victoria-ivleva-44192b2a.

Oral Proceedings received for corresponding European Patent Application No. 18161323.3, dated Apr. 14, 2021, 10 pages.

* cited by examiner

US 11,386,608 B2

MODIFYING A POSITION OF A CONFLICTING OBJECT IN A RENDERED VIRTUAL SCENE

RELATED APPLICATION

This application claims priority to PCT Application No. PCT/EP2019/054195, filed on Feb. 20, 2019, which claims priority to European Application No. 18161323.3, filed on Mar. 12, 2018, each of which is incorporated herein by reference in its entirety.

TECHNICAL FIELD

Example embodiments relate to rendering a virtual scene, for example a virtual reality (VR) scene, for modifying the position of one or more conflicting objects.

BACKGROUND

Virtual reality (VR) is a developing area of technology in which one or both of video and audio content is provided to a user device.

The user device may be provided with a live or stored feed from a content source, the feed representing a virtual reality space for immersive output through the user device. A virtual space may be any computer-generated version of a space, for example a captured real world space. The user device may be a virtual reality headset for providing one or both of virtual reality video and spatial audio content to the user, for example through the use of a pair of video screens and headphones incorporated within the headset. The position of the user in a physical space may determine which part of the virtual space is provided to the user device. The provided scene may change as the user moves, which may be one or both of translational and rotational movement.

SUMMARY

One embodiment may provide an apparatus comprising: means for rendering a virtual scene of a virtual space that corresponds to a virtual position of a user in the virtual space as determined at least in part by the position of the user in a physical space; means for identifying one or more objects in the virtual scene which are in conflict with attributes of the physical space; means for detecting one or more blinking periods of the user when rendering the virtual scene; and means for modifying the position of the one or more conflicting objects in the virtual scene based on a detected context of one or both of the user and the one or more objects, the modifying being performed within the one or more detected blinking periods.

The modifying means may be configured to modify the position of the one or more conflicting objects relative to the remainder of the virtual scene.

The identifying means may be configured to identify one or more conflicting objects based on their rendered position in the virtual scene at least partially overlying a physical object or barrier in the physical space.

The modifying means may be configured to modify the position of the one or more conflicting objects in the virtual scene differently in a plurality of detected blinking periods.

The detected context may be determined based on the position of the one or more conflicting objects in the field-of-view of the user at the one or more blinking periods.

The modifying means may be configured to modify the position of the one or more conflicting objects by an amount dependent on the position of the one or more conflicting objects in the field-of-view of the user at the one or more blinking periods.

The modifying means may be configured to modify the position of the one or more conflicting objects by an increasing amount in relation to the distance of the one or more conflicting objects from a central region of the field-of-view.

The detected context may be based on detected movement of the one or more conflicting objects in the field-of-view of the user at the one or more blinking periods.

The modifying means may be configured to modify the position of the one or more conflicting objects by an amount dependent on the amount of movement of the one or more conflicting objects in the field-of-view of the user at the one or more blinking periods.

The detected context may be based on detected movement of the user at the one or more blinking periods.

The modifying means may be configured to modify the position of the one or more conflicting objects by an amount dependent on the amount of movement of the user at the one or more blinking periods.

The modifying means may be configured to modify the position of the one or more objects by an increasing amount in relation to the amount of movement of the one or more conflicting objects or the user at the one or more blinking periods.

The apparatus may further comprise means for detecting one or more objects of interest within the virtual space, being a subset of a plurality of objects in the virtual space, wherein the modifying means is configured only to modify the position of the one or more objects of interest which are in conflict with attributes of the physical space.

The means for detecting the one or more objects of interest may be configured to predict one or more objects that the user is to interact with.

The apparatus may further comprise means for temporarily rendering the one or more conflicting objects in a manner which indicates their conflicting status until such time as their position is modified so that they are no longer in conflict.

The means as defined above may comprise: at least one processor; and at least one memory including computer program code, the at least one memory and computer program code to configured to, with the at least one processor, cause the performance of the apparatus.

Another embodiment may provide a method comprising: rendering a virtual scene of a virtual space that corresponds to a virtual position of a user in the virtual space as determined at least in part by the position of the user in a physical space; identifying one or more objects in the virtual scene which are in conflict with attributes of the physical space; detecting one or more blinking periods of the user when consuming the virtual scene; and modifying the position of the one or more conflicting objects in the virtual scene based on a detected context, the modifying being performed within the one or more detected blinking periods.

The modifying may comprise modifying the position of the one or more conflicting objects relative to the remainder of the virtual scene. The identifying may identify one or more conflicting objects based on their rendered position in the virtual scene at least partially overlying a physical object or barrier in the physical space. The modifying may modify the position of the one or more conflicting objects in the virtual scene differently in a plurality of detected blinking periods. The detected context may be determined based on the position of the one or more conflicting objects in the field-of-view of the user at the one or more blinking periods. The modifying may modify the position of the one or more conflicting objects by an amount dependent on the position of the one or more conflicting objects in the field-of-view of the user at the one or more blinking periods. The modifying may modify the position of the one or more conflicting objects by an increasing amount in relation to the distance of the one or more conflicting objects from a central region of the field-of-view. The detected context may be based on detected movement of the one or more conflicting objects in the field-of-view of the user at the one or more blinking periods. The modifying may modify the position of the one or more conflicting objects by an amount dependent on the amount of movement of the one or more conflicting objects in the field-of-view of the user at the one or more blinking periods. The detected context may be based on detected movement of the user at the one or more blinking periods. The modifying may modify the position of the one or more conflicting objects by an amount dependent on the amount of movement of the user at the one or more blinking periods. The modifying may modify the position of the one or more objects by an increasing amount in relation to the amount of movement of the one or more conflicting objects or the user at the one or more blinking periods.

The method may further comprise detecting one or more objects of interest within the virtual space, being a subset of a plurality of objects in the virtual space, wherein the modifying only modifies the position of the one or more objects of interest which are in conflict with attributes of the physical space.

Detecting the one or more objects of interest may predict one or more objects that the user is to interact with.

The method may further comprise temporarily rendering the one or more conflicting objects in a manner which indicates their conflicting status until such time as their position is modified so that they are no longer in conflict.

Another embodiment may provide a computer program comprising instructions for causing an apparatus to perform at least the following: rendering a virtual scene of a virtual space that corresponds to a virtual position of a user in the virtual space as determined at least in part by the position of the user in a physical space; identifying one or more objects in the virtual scene which are in conflict with attributes of the physical space; detecting one or more blinking periods of the user when consuming the virtual scene; and modifying the position of the one or more conflicting objects in the virtual scene based on a detected context, the modifying being performed within the one or more detected blinking periods.

Another embodiment provides a non-transitory computer-readable medium having stored thereon computer-readable code, which, when executed by at least one processor, causes the at least one processor to perform a method, comprising: rendering a virtual scene of a virtual space that corresponds to a virtual position of a user in the virtual space as determined at least in part by the position of the user in a physical space; identifying one or more objects in the virtual scene which are in conflict with attributes of the physical space; detecting one or more blinking periods of the user when consuming the virtual scene; and modifying the position of the one or more conflicting objects in the virtual scene based on a detected context, the modifying being performed within the one or more detected blinking periods.

Another aspect provides an apparatus, the apparatus having at least one processor and at least one memory having computer-readable code stored thereon which when executed controls the at least one processor: to render a virtual scene of a virtual space that corresponds to a virtual position of a user in the virtual space as determined at least in part by the position of the user in a physical space; to identify one or more objects in the virtual scene which are in conflict with attributes of the physical space; to detect one or more blinking periods of the user when consuming the virtual scene; and to modify the position of the one or more conflicting objects in the virtual scene based on a detected context, the modifying being performed within the one or more detected blinking periods.

BRIEF DESCRIPTION OF THE DRAWINGS

Example embodiments will now be described with reference to the accompanying drawings, to in which.

DETAILED DESCRIPTION

Figure 1:
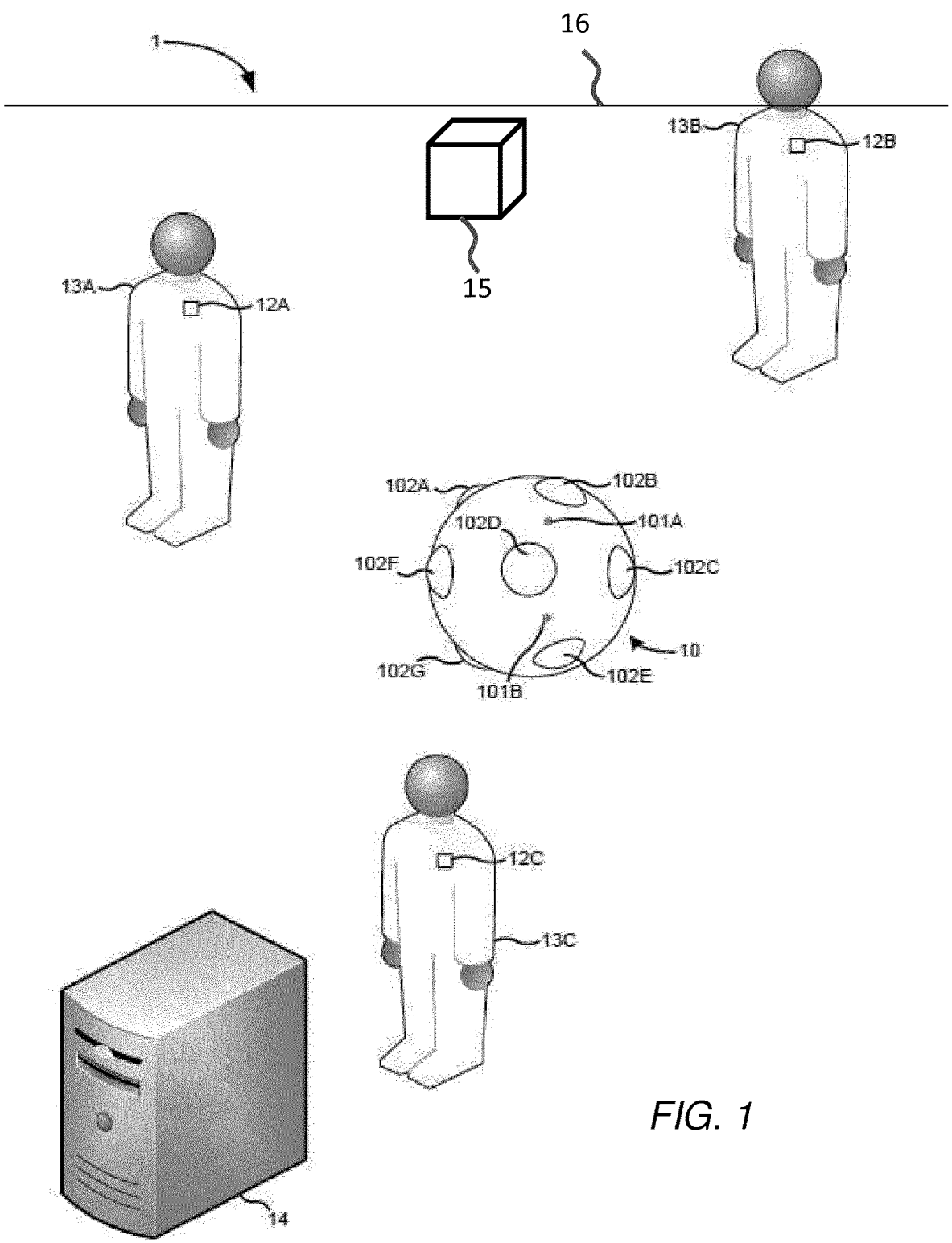
FIG. 1 is an example of a video and audio capture system for capturing a virtual space for use in example embodiments disclosed herein.

In the description and drawings, like reference numerals refer to like elements throughout.

Example embodiments relate generally to the rendering of a virtual scene of a virtual space, for example a virtual reality (VR) scene, an augmented reality (AR) scene or a mixed reality (MR) scene. Example embodiments may relate to applications involving six degrees-of-freedom (6DoF) within volumetric scenes, for example scenes represented by video and/or audio content. The virtual scene of the virtual space may correspond to a virtual position of a user in the virtual space as determined at least in part by the position of the user in a physical to space.

A virtual space may mean a virtual visual space, a virtual sound space or a combination of a virtual visual space and a corresponding virtual sound space. In some examples, the virtual space may extend horizontally up to 360° and may extend vertically up to 180°. Other extents of the virtual space may be used.

A virtual scene may mean a virtual visual scene, a virtual sound scene or a combination of a virtual visual scene and corresponding virtual sound scene. A virtual visual scene may refer to a representation of the visual space viewed from a particular virtual position within the visual space. A virtual visual space may refer to a fully or partially artificial environment that may be viewed, which may be three dimensional. An artificial environment may be something that has been recorded or generated. A virtual sound scene may refer to a representation of the virtual sound space listened to from a particular virtual position within the sound space. A virtual sound space may refer to an arrangement of sound sources in a three-dimensional space. A virtual sound space may be defined in relation to recording sounds, a recorded virtual sound space, and in relation to rendering sounds, a rendered virtual sound space.

A virtual visual object may be a visible object within the virtual visual scene. A sound object may refer to sound source that may be located within the virtual sound space. A source sound object may represent a sound source within the sound space. A recorded sound object may represent sounds recorded at a particular microphone or position. A rendered sound object may represent sounds rendered from a particular position. For the avoidance of doubt, the term "virtual object" will be used herein and can refer to any of the above.

The term "physical object" may refer to any real-world object, which may include attributes such as furniture, other people, dimensions and structural attributes such as one or more walls that exist within or around a physical space within which the user is situated when consuming a virtual scene.

A virtual scene may be a part of a virtual space. The virtual space may comprise a computer-generated version of a space in which a user can be immersed and move within, for example by means of a change of orientation and/or translational movement. The virtual space may be a captured version of a real space. The virtual space may be captured and relayed to the user in real-time, near real-time or it may be stored for offline consumption. The virtual scene may comprise one or more of a virtual video scene and a virtual sound space, as to mentioned above. The user, usually wearing or carrying a user device such as a virtual reality headset having one or more display screens and earphones, may explore the space by moving, which may be with three degrees-of-freedom (3DoF), whereby the user may rotate their head in the yaw, pitch and roll axes, or with six degrees-of-freedom (6DoF) whereby the user is able to move relatively freely in the Euclidean space and rotate their head in the yaw, pitch and roll axes.

Embodiments particularly relate to methods and apparatuses for rendering a virtual scene of a virtual space that corresponds to a virtual position of a user in the virtual space, as determined at least in part by the position of the user in a physical space. The methods and apparatuses may identify one or more objects, for example virtual objects, in the virtual scene which may be in conflict with attributes of the physical space. Attributes of the physical space may comprise, by way of example, one or more of dimensions of the physical space and one or more physical objects in the physical space which may include structural attributes including walls, pillars and other objects such as furniture.

A virtual object may be in conflict with an attribute of the physical space if the latter restricts movement of the user in the physical space or interaction of the user in relation to the virtual scene. For example, a user may not be able to reach or interact with a virtual object because an attribute of the physical space does not permit it or prevents free movement in relation to the virtual object. For example, a virtual object at least partially overlying a physical object may be considered in conflict. For example, a virtual object that is located at least partially behind a physical object may be considered in conflict. For example, a virtual object that extends at least partially beyond the boundary of the physical space, possibly beyond a wall, may be considered in conflict.

It will be appreciated that a virtual object in conflict with an attribute of the physical space potentially limits the user's ability to explore the virtual space. In some situations, it may present a risk of injury, for example if a user were to walk into a physical object whilst moving in the physical space, in correspondence to movement in the virtual space. In general, users may be restricted by the limited dimensions of the physical space within which they are consuming the virtual space.

Example embodiments involve detecting one or more blinking periods of the user when consuming the virtual scene, and modifying the position of the one or more conflicting objects in the virtual scene within the one or more detected blinking periods. The modifying may be based on a detected context, for example the context of the user or the one or more objects, or a combination thereof.

A blinking period may be considered a time period when one or both of a user's eyes are closed. Blinking is a normal bodily function which serves to spread tears across the surface of the eye and remove irritants. Blink speeds and rates may vary from person to person. Example embodiments may therefore employ any form of detection means to detect when a user's eyes are closed, in order to determine one or more blinking periods. Example embodiments may employ one or more of Electrooculography (EDG) sensors which provide data indicating blinks, logic for detecting the blinks, and eye-tracking cameras for detecting blinks in a known manner. Such means may be provided in a user device such as a virtual reality (VR) headset, one or more room-mounted cameras, or similar. Individual blinking periods may be determined as they happen, e.g. in real-time or near real-time. In some example embodiments, a prediction algorithm may be used to estimate when future blinking periods will occur. For example, a learned model and/or an artificial neural network may be used to predict future blinking periods.

A user consumes a virtual scene when it is being rendered to an associated user device for visual and/or audible output. Rendering is the process by which data representing the virtual scene is converted into a visual and/or audible version of the virtual scene for output.

A context of the user may comprise any detected or predicted characteristic of the user, for example their movement, which may be their overall movement or head movement, for example.

Similarly, a context of the one or more objects may comprise any detected or predicted characteristic of an object, primarily a virtual object. For example, the context may comprise the location of a virtual object in a field-of-view, the type of virtual object and/or the movement of the virtual object.

The context may be based on both user and object contexts, or a relationship between the contexts, for example a relative movement between a user and a virtual object.

The context may be based on where in the field-of-view one or more virtual objects appear. For example, a virtual object detected in a central zone of the field-of-view may be indicative of one context, different from if a, or the, virtual object is detected in a peripheral zone which is outside the central zone. Different modification rules may apply to the different contexts, for example different amounts of movement per blinking period.

For example, the context of a user may be based on the movement of the user at, i.e. during or just before, a blinking period. Zero movement may be an indication of context. Where there is movement, the movement may be translational and/or rotational. The context may be based on the speed, direction and/or extent of user movement. The context may be based on whether a user is, or intends, interacting with an object.

The context of an object may be based on whether the object is moving or not at, i.e. during or just before, a particular blinking period. The movement may be translational and/or rotational. The context may be based on the speed, direction and/or extent of user movement.

The context may be based on whether the virtual object is within a particular part of the user's field-of-view at a particular blinking period. For example, the user's field-of-view may be segmented into different regions or zones, and a first context may be determined if the object is in a central zone and a second context may be determined if the object is in one or more peripheral zones.

Different rules may apply to different contexts. The rules may be predetermined. In some embodiments, the rules may be adaptive, that is they may depend on previous contexts for example.

Example embodiments may therefore involve modifying the position of one or more virtual objects in the virtual space whilst the user is blinking, thereby improving full exploration of a virtual space and/or minimizing the potential for the user to collide with conflicting objects in a way that is less intrusive or noticeable to the user.

In some example embodiments, the amount of movement in a given blinking period is dependent on where one or more virtual objects appears in the field-of-view of the user at the blinking period. Therefore, the amount of movement may vary for one or more subsequent blinking periods so as to minimize how noticeable the movement is. The amount of movement may depend on how fast the user is moving, or the one or more virtual objects are moving at the blinking period. Movement and the amount of movement may be restricted to one or more virtual objects that are of interest to the user at a blinking period, for example a virtual object that the user wishes to interact with. Whether or not a user wishes to interact with one or more virtual objects may be determined using known methods, such as based on gaze direction, one or more user gestures, directional movement of the user and/or speed of movement towards a particular virtual object. Prediction methods may also be employed, for example based on the type of object and what object types the user has historically interacted with. The amount of movement may be based on one, or a combination of two or more of the above examples.

The apparatus, method and computer program for rendering the virtual scene according to example embodiments may be provided anywhere in a related network, for example at the service provider end, where media is stored and streamed to one or more users, or at the user end, for example at the user device or an associated media player. In example embodiments, it is assumed that example embodiments are implemented at the user end.

Attributes of the physical space may be stored or dynamically determined. For example, one or more cameras may be placed at least initially in the physical space to determine physical attributes, such as one or more dimensions of the space and/or the location and attributes of physical objects such as furniture and elements such as pillars and fireplaces. Any suitable camera may be used for this purpose. Alternatively, or additionally, manual input of data indicative of the physical space attributes may be employed. For example, a user interface may permit entry of the dimensions of the physical space, and placement of one or more markers indicative of objects such as furniture. The nature of the attributes, such as whether they are fixed or movable may also be added.

FIG. 1 is an example of a video and audio capture system 1 ("capture system") which may be used to capture a virtual video scene and a corresponding sound scene for processing in accordance with examples described herein. In this example, the capture system 1 comprises a spatial video and audio capture apparatus 10 ("capture apparatus") configured to capture an omnidirectional video scene, a spatial audio signal, and one or more additional audio capture devices 12A, 12B, 12C.

The capture apparatus 10 may comprise a plurality of visual content capture devices 102A-G (e.g. cameras) and a plurality of audio capture devices 101A, B (e.g. directional or non-directional microphones). The audio capture devices 101A, B are arranged to capture audio signals which may subsequently be spatially rendered into an audio stream in such a way that the reproduced sound is perceived by a listener as originating from at least one virtual spatial position. Typically, the sound captured by the capture apparatus 10 is derived from plural different audio objects which may be at one or more different locations relative to the capture apparatus 10. As the captured spatial audio signal includes components derived from plural different sounds sources, it may be referred to as a composite audio signal. Although only two audio capture devices 101A, B are visible in FIG. 1, the capture apparatus 10 may comprise more than two devices 101A, B. For instance, in some specific examples, the capture apparatus 10 may comprise eight audio capture devices.

The visual content capture devices 102A-G of the capture apparatus 10 may be configured to capture visual content from various different directions around the apparatus, thereby to provide immersive (or virtual reality) content for consumption by users. In the example of FIG. 1, the capture apparatus 10 is a presence-capture device, such as Nokia's OZO device. However, as will be appreciated, the capture apparatus 10 may be another type of device and/or may be made up of plural physically separate devices. For example, the capture apparatus 10 may record only one of audio and video. As will also be appreciated, although the content captured may be suitable for provision as immersive content, it may also be provided in a regular non-virtual reality format, for instance via a smart phone or tablet computer.

As mentioned previously, in the example of FIG. 1, the capture system 1 further comprises one or more additional audio capture devices 12A-C. Each of the additional audio capture devices 12A-C may comprise at least one microphone and, in the example of FIG. 1, the additional audio capture devices 12A-C are lavalier microphones configured for capture of audio signals derived from an associated user 13A-C. The users 13A-C represent sound or audio objects in this context in that they produce sound. For instance, in FIG. 1, each of the additional audio capture devices 12A-C is associated with a different user by being affixed to the user in some way. However, it will be appreciated that, in other examples, the additional audio capture devices 12A-C may take a different form and/or may be located at fixed, predetermined locations within a capture environment.

In the example of FIG. 1, one or more non-audio objects 15, 16 are shown, in the form of a block which may represent an item of furniture, and a wall or boundary. Both objects 15, 16 are captured only in terms of visual content by one or more of the visual content capture devices 102A-G.

The locations of the various objects or attributes within the capture space, which may comprise the additional audio capture devices 12A-C, the non-audio objects 15,16 and/or the capture apparatus 10 within the capture environment may be known by, or may be determinable by, the capture system 1 (for instance, a processing apparatus 14 of the capture system). For instance, the objects or attributes may include a location determination component for enabling their locations to be determined. In some specific examples, a radio frequency location determination system such as High Accuracy Indoor Positioning (HAIP) may be employed, whereby the additional audio capture devices 12A-C, the non-audio objects 15, 16 and/or the capture apparatus 10 transmit messages for enabling a location server to to determine their location within the audio capture environment. In other examples, the locations may be pre-stored by an entity which forms part of the capture system 1 (for instance, at the processing apparatus 14).

In the example of FIG. 1, the capture system 1 further comprises the processing apparatus 14, which is configured to receive and store video and audio signals captured by the capture apparatus 10 and the one or more additional audio capture devices 12A-C. The signals may be received at the processing apparatus 14 in real-time during capture of the video and audio signals or may be received subsequently, for instance via an intermediary storage device. In such examples, the processing apparatus 14 may be local to the capture environment or may be geographically remote from the capture environment. In some examples, the processing apparatus 14 may even form part of the capture apparatus 10.

The video and audio signals received by the processing apparatus 14 may be in any suitable format. For example, the audio signals may comprise a multichannel audio input in a loudspeaker format. Such formats may include, but are not limited to, a stereo signal format, a 4.0 signal format, 5.1 signal format and a 7.1 signal format. In such examples, the signals may have been pre-processed from their original raw format into the loudspeaker format. Alternatively, in other examples, the audio signals may be in a multi-microphone signal format, such as a raw eight channel input signal. The raw multi-microphone signals may, in some examples, be pre-processed by the processing apparatus 14 using spatial audio processing techniques thereby to convert the received signals to loudspeaker format or binaural format.

The processing apparatus 14 may be further configured to perform (or allow performance of) spatial repositioning of the captured objects, in terms of video and/or audio signals which represent them.

Figure 2:
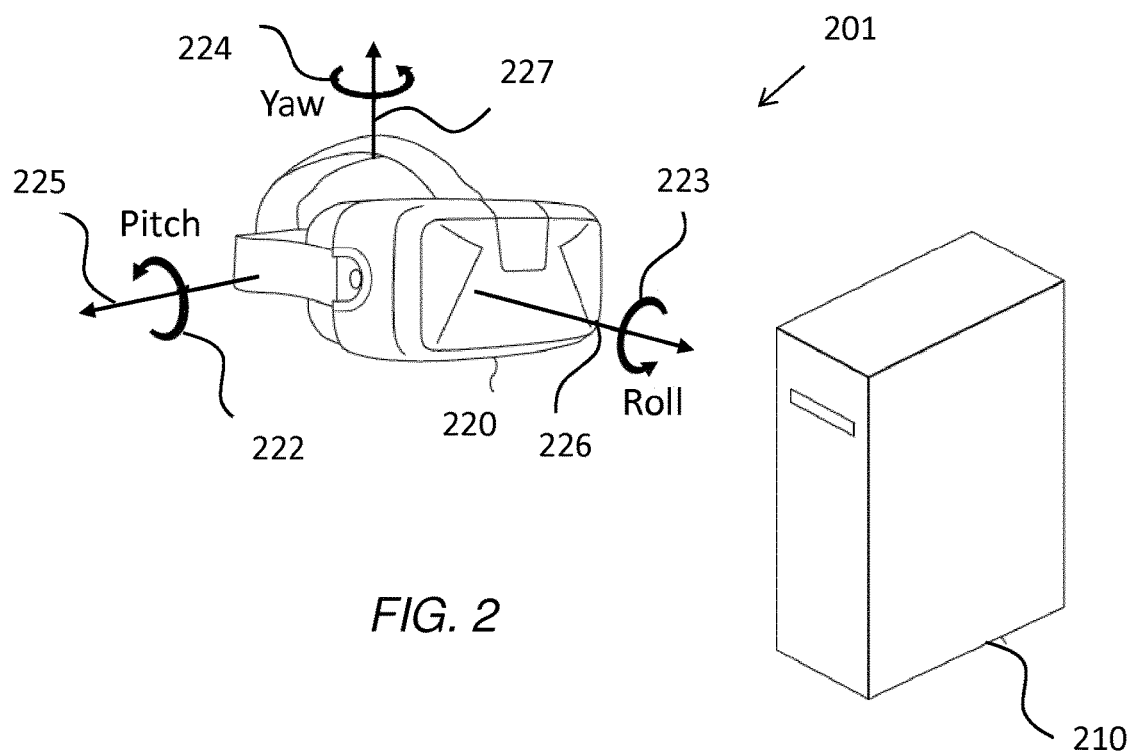
FIG. 2 is a perspective view of a virtual reality display system, in accordance with example embodiments.

FIG. 2 is a schematic illustration of a virtual reality display system 201 ("display system") which represents user-end equipment. The display system 201 includes a user device in the form of a virtual reality headset 220 ("headset") for displaying visual data for a virtual space, and a virtual reality media player 210 ("media player") for rendering visual data to the headset 220. In some example embodiments, a separate user control (not shown) may be associated with the display system 201, e.g. a hand-held controller.

In the context of this specification, a virtual space is any computer-generated version of a space, for example a captured real world space, in which a user can be immersed. In some example embodiments, the virtual space may be entirely computer-generated, i.e. not captured using the FIG. 1 spatial audio capture apparatus. The headset 220 may be of any suitable type. The headset 220 may be configured to provide the video and/or audio data "content data" to a user. As such, the user may be immersed in the virtual space.

In example embodiments, the headset 220 receives the content data from the media player 210. The media player 210 may be part of a separate device which is connected to the headset 220 by a wired or wireless connection. For example, the media player 210 may include a games console, or a PC configured to communicate content data to the headset 220.

Alternatively, the media player 210 may form part of the headset 220.

Here, the media player 210 may comprise a mobile phone, smartphone or tablet computer configured to play content through its display. For example, the media player 210 may be a touchscreen device having a large display over a major surface of the device, through which video content can be displayed. The media player 210 may be inserted into a holder of the headset 220. With such headsets 220, a smart phone or tablet computer may display visual data which is provided to a user's eyes via respective lenses in the headset 220. The display system 1 may also include hardware configured to convert the device to operate as part of the display system 201. Alternatively, the media player 210 may be integrated into the headset 220. The media player 210 may be implemented in hardware, software or a combination thereof. In some example embodiments, a device comprising media player software is referred to as the media player 210.

The display system 201 may include a means for determining the spatial position of the user and/or orientation of the user's head. This may be by means of determining the spatial position and/or orientation of the headset 220. Over successive time frames, a measure of movement may therefore be calculated and stored. Such means may comprise part of the media player 210. Alternatively, the means may comprise part of the headset 220. For example, the headset 20 may incorporate motion tracking sensors which may include one or more of gyroscopes, accelerometers and structured light systems. These sensors generate position data from which a current visual field-of-view is determined and updated as the user, and so the headset 220, changes position and/or orientation. The headset 220 may comprise two digital screens for displaying stereoscopic video images of the virtual world in front of respective eyes of the user, and also two headphones, earphone or speakers for delivering audio. The example embodiments herein are not limited to a particular type of headset 220.

In some example embodiments, the display system 201 may determine the spatial position and/or orientation of the user's head using the above-mentioned six degrees-of-freedom method. As shown in FIG. 1, these include measurements of pitch 222, roll 223 and yaw 224, and also translational movement in Euclidean space along side-to-side, front-to-back and up-and-down axes 225, 226, 227.

The display system 201 may be configured to display the content data to the headset 220 based on spatial position and/or the orientation of the headset. A detected change in spatial position and/or orientation, i.e. a form of movement, may result in a corresponding change in the visual and/or audio data to reflect a position or orientation transformation of the user with reference to the virtual space into which the visual data is projected. This allows content data to be consumed with the user experiencing a virtual reality environment.

In the context of volumetric virtual spaces, this means that the user's position can be detected relative to content provided within the volumetric virtual content, e.g. so that the user can move freely within a given virtual space, around individual objects or groups of objects, and can view and/or listen to the objects from different angles depending on the rotation of their head. In example embodiments, the user may also view and explore a plurality of different virtual spaces and move from one virtual space to another one.

Audio content data may be provided to headphones provided as part of the headset 220. The audio content data may represent spatial audio source content and/or may represent signals from the additional audio capture devices 12A-C shown in FIG. 1. Spatial audio content may refer to directional rendering of audio in the virtual space such that a detected change in the user's spatial position or in the orientation of their head may result in a corresponding change in the spatial audio rendering to reflect a transformation with reference to the space in which the audio content data is rendered.

The angular extent of the virtual space observable or hearable through the virtual reality headset 220 is called the visual or audible field-of-view. The actual field-of-view observed by a user in terms of visuals depends on the inter-pupillary distance and on the distance between the lenses of the headset 220 and the user's eyes, but the field-of-view can be considered approximately the same for all users of a given headset when the virtual reality headset is being worn by the user.

Figure 3:
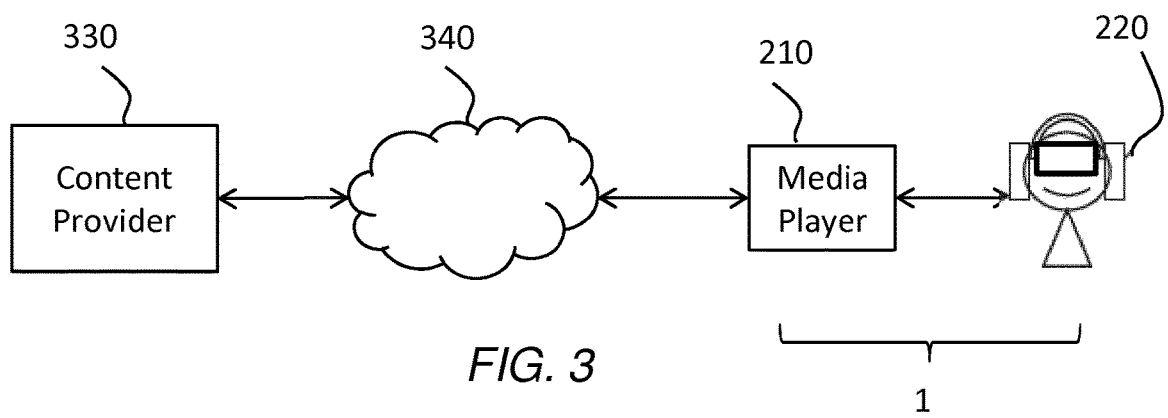
FIG. 3 is a block diagram of a computer network, including the FIG. 2 virtual reality display system, in accordance with example embodiments.

Referring to FIG. 3, a content provider 330, which may be the processing apparatus 14 shown in FIG. 1, may store and transmit streaming content data which, in the context of example embodiments, is volumetric content data for output to the headset 220. Responsive to receive or download requests sent by the media player 210, the content provider 230 streams the content data over a data network 340, which may be any network, for example an IP network such as the Internet.

The content provider 330 may or may not be the location or system where the virtual reality video is captured, created and/or processed.

For illustration purposes, we may assume that the content provider 330 also captures, encodes and stores the virtual reality content, as well as streaming it responsive to signals from the display system 201.

Figure 4:
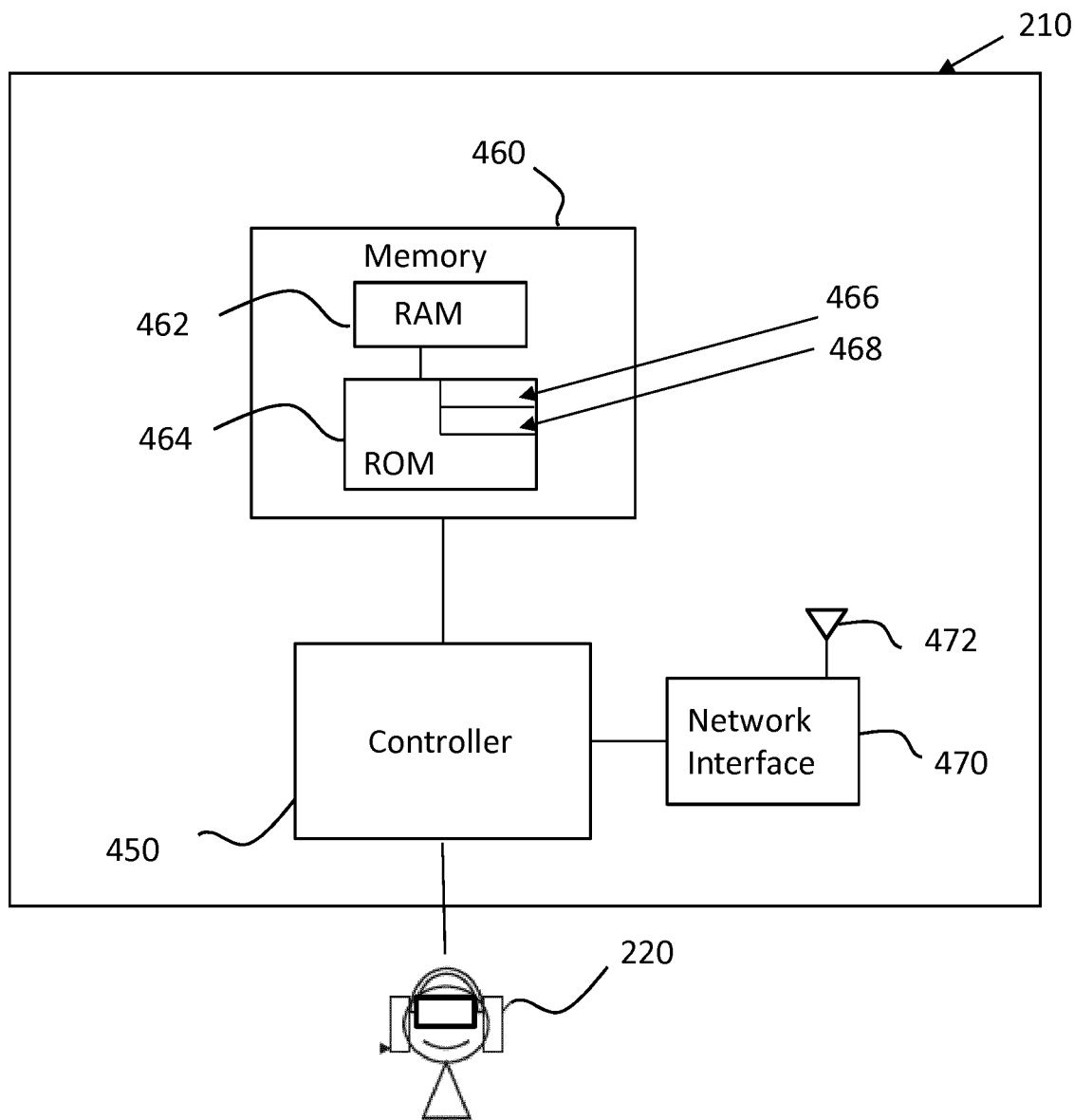
FIG. 4 is a schematic view of components of a media player forming part of the FIG. 2 virtual reality display system, in accordance with example embodiments.

FIG. 4 is a schematic diagram of components of the media player 210. This assumes that embodiments herein are processed within the media player 210 but it should be appreciated that embodiments may be processed within the headset 220, in which case corresponding components will be present.

The media player 210 may have a controller 450, a memory 460 closely coupled to the controller and comprised of a RAM 462 and ROM 464 and a network interface 470. It may additionally, but not necessarily, comprise a display and hardware keys. The controller 450 is connected to each of the other components to control operation thereof.

The network interface 470 may be configured for connection to the network 340, e.g. a modem which may be wired or wireless. An antenna 472 is shown for wireless connection, which may use WiFi and/or Bluetooth, for example. Data regarding the position of the headset 220 may be received by means of the network interface 470 and video and/or audio data may be transmitted to the headset 220 by means of this network interface.

The memory 460 may comprise a hard disk drive (HDD) or a solid state drive (SSD). The ROM 464 of the memory 460 stores, amongst other things, an operating system 466 and may store one or more software applications 468. The RAM 462 is used by the controller 450 for the temporary storage of data. The operating system 466 may contain code which, when executed by the controller 450 in conjunction with the RAM 462, controls operation of each of the hardware components.

The controller 450 may take any suitable form. For instance, it may be a microcontroller, plural microcontrollers, a processor, or plural processors.

In some example embodiments, the media player 210 may also be associated with external software applications. These may be applications stored on a remote server device and may run partly or exclusively on the remote server device. These applications may be termed cloud-hosted applications or data. The media player 210 may be in communication with the remote server device in order to utilize the software application stored there.

Example embodiments herein will now be described in greater detail. The processing operations to be described below may be performed by the software application 468 provided on the memory 460, or on hardware or a combination thereof.

Figure 5:
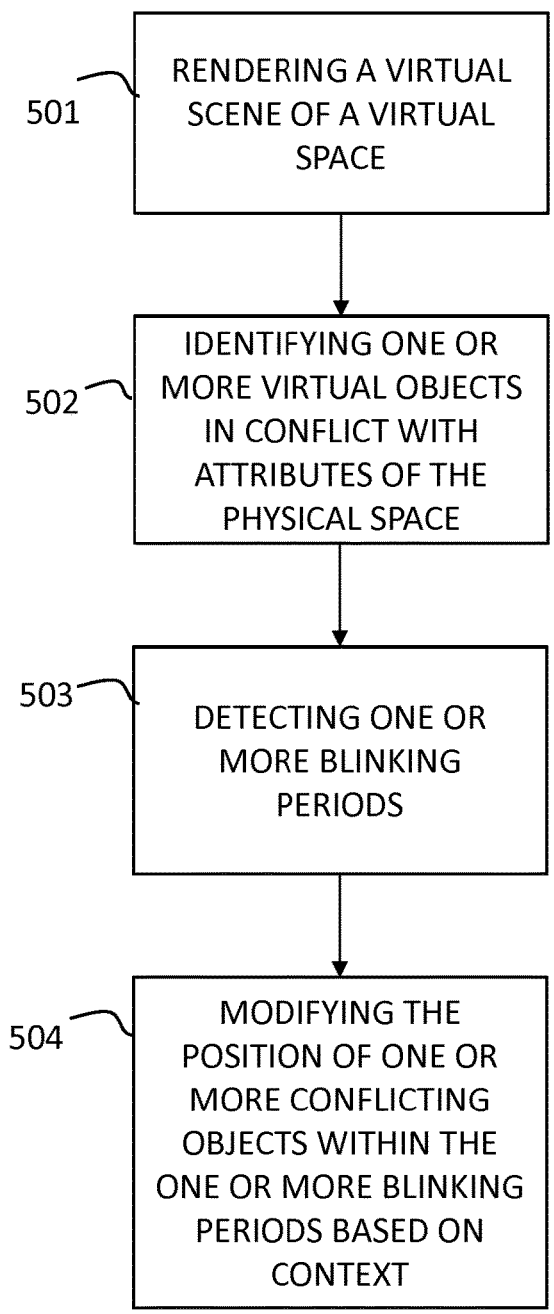
FIG. 5 is a flow diagram showing operations that may be performed by the media player forming part of the FIG. 2 virtual reality display system, in accordance with example embodiments.

FIG. 5 is a flow diagram showing processing operations that may be performed by software, hardware or a combination thereof. For example, the operations may be performed by the software application 468. The order of operations is not necessarily indicative of the order of processing or performance.

A first operation 501 may comprise rendering a virtual scene of a virtual space. A virtual scene may mean a virtual visual scene, a virtual sound scene or a combination of a virtual visual scene and corresponding virtual sound scene. A virtual space may mean a virtual visual space, a virtual sound space or a combination of a virtual visual space and a corresponding virtual sound space.

A second operation 502 may comprise identifying one or more virtual objects in conflict with attributes of the physical space. A virtual object may be in conflict with an attribute of the physical space if the latter restricts movement or interaction of the user in relation to the virtual scene. A physical space is any real-world space within which the user may be situated when consuming the virtual scene, and attributes thereof may refer to any real-world object, people, dimensions and structural attributes such as one or more walls that exist within or around the physical space.

A third operation 503 may comprise detecting one or more blinking periods. A blinking period may be considered a time period when one or both of a user's eyes are closed.

A fourth operation 504 may comprise modifying the position of one or more conflicting objects within the one or more blinking periods based on context. Examples of context are described above.

Figure 6:
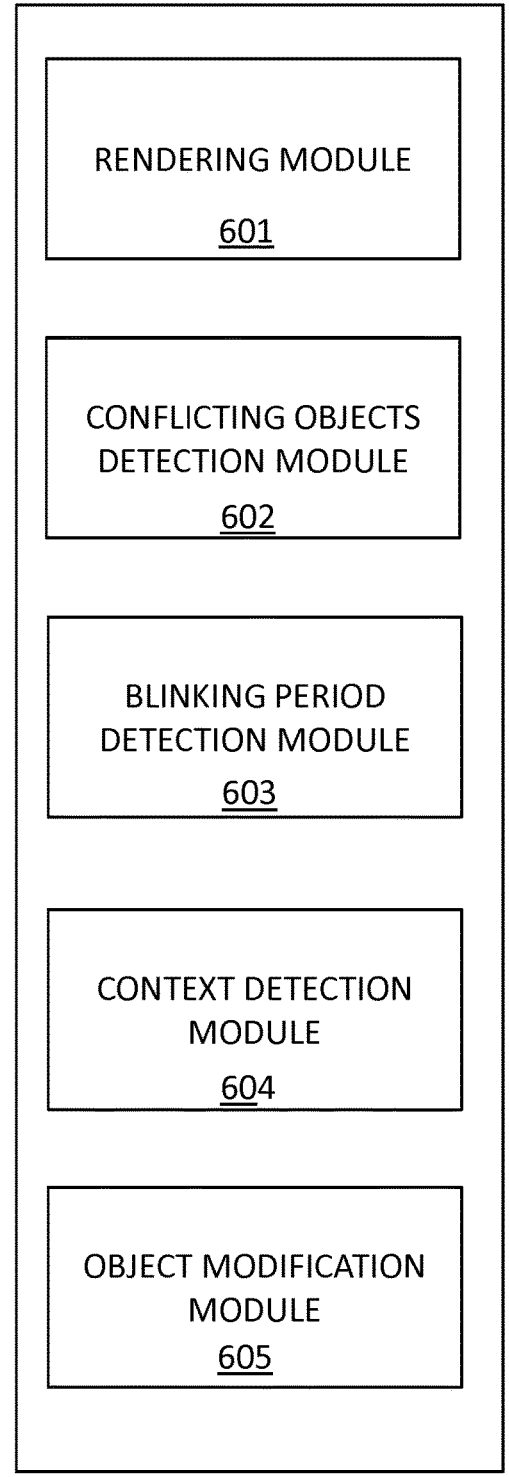
FIG. 6 is a schematic view of functional modules of the media player forming part of the FIG. 2 virtual reality display system, in accordance with example embodiments.

FIG. 6 is a schematic diagram of functional modules that may be provided in, for example, to the media player 210, whether in the form of hardware or software functional modules or a combination thereof. A rendering module 601 is configured to render the video and/or audio content based on virtual content data. A conflicting objects detection module 602 is configured to detect one or more virtual objects in conflict with attributes of the physical space within which the user is located. A blinking period detection module 603 is configured is to detect or predict the time period(s) when a user is blinking, for example using sensors and/or prediction modules or logic. A context detection module 604 is configured to detect, determine or predict a context, primarily based on user and/or virtual object attributes. An object modification module 605 is configured to modify the position of one or more of the conflicting objects based on the context.

Figure 7A:
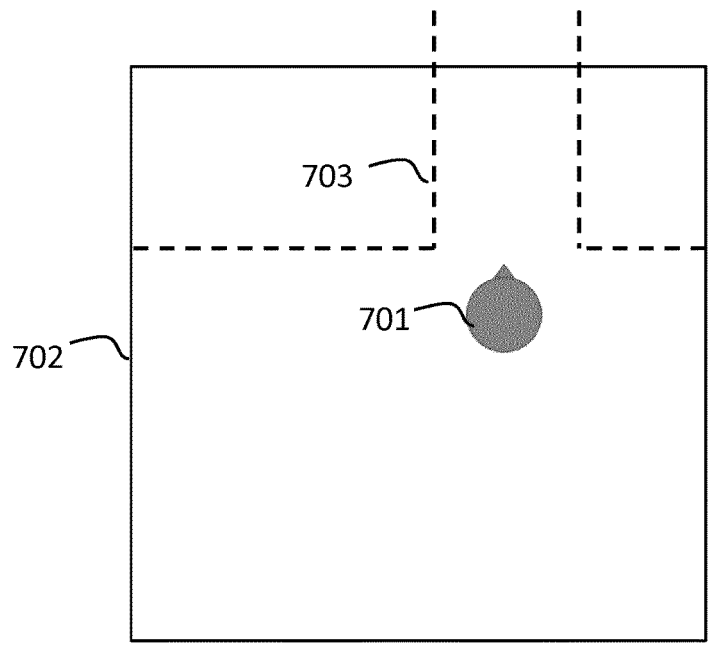
FIGS. 7A and 7B are plan view diagrams of showing respective first and second states of a user within a physical space, consuming a virtual scene, in which part of the virtual scene is modified in accordance with example embodiments.
Figure 7B:
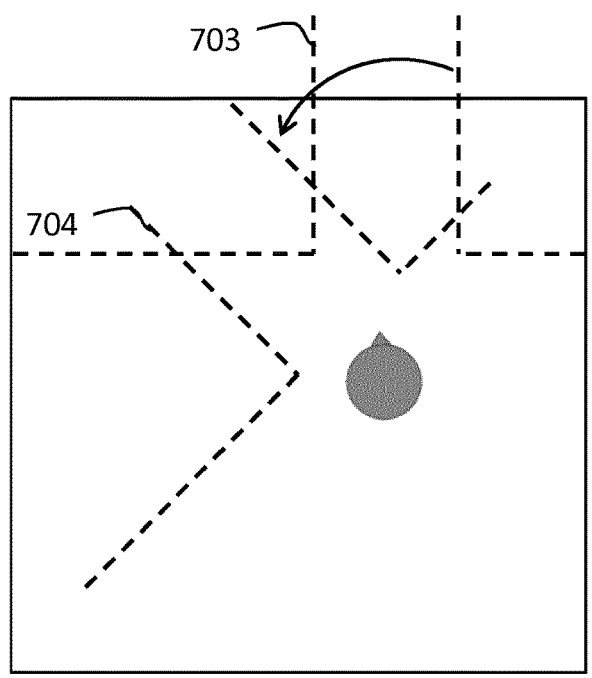

FIGS. 7A and 7B indicate an example embodiment of the above processing operations in use. FIG. 7A indicates a first state at a first time. A user 701 wearing a headset is shown positioned in a physical space 702 when consuming a virtual space. A virtual scene, being a portion of the virtual space corresponding to the field-of-view, is rendered to the headset and includes a virtual object in the form of a corridor 703 indicated by dashed lines. The corridor 703 is determined to be in conflict with attributes of the physical space 702 because part of it overlies an upper boundary wall. The user 701 is therefore prevented from full exploration of the corridor 703 in the virtual scene because of the upper boundary wall, and the user is at risk from walking into the wall. Referring to FIG. 7B, in accordance with example embodiments, during one or more blinking periods, the corridor 703 is moved based on the fact that the corridor is within the user's field-of-view, an example of context. In some embodiments, the corridor may only be moved if the user 701 moves towards the corridor 703, which is a different example of context. In some embodiments, the corridor 703 may only be moved if it is considered an object of interest, for example if it is predicted that the user wishes to interact with the corridor. This is another example of context. Another example of context is if the corridor 703 is within a particular part of the user's field-of-view, for example if it is centrally located.

The amount of movement may be such that the user 701 does not, or should hardly, notice the movement when rendered to the headset. For this purpose, the amount of movement may be iterative in subsequent blinking periods to minimise user perception. In some embodiments, the amount of movement may be different for subsequent blinking periods and, as will be explained below, the amount of movement may be based on where in the user's field-of-view the conflicting object is located.

The modification may be continued until the conflicting object, i.e. the corridor 703, is no longer considered conflicting, permitting the user to explore the corridor in an improved way with minimal perception that they have changed orientation in the physical space 702.

Although a corridor 703 is given as an example, it will be appreciated that the same principles may be applied to any form of physical attribute, including one or more physical objects such as furniture or other structures such as pillars.

Figure 8A:
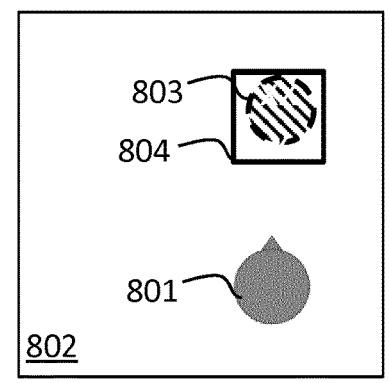
FIGS. 8A and 8B are plan view diagrams of another example showing respective first and second states of a user within a physical space, consuming a virtual scene, in which part of the virtual scene is modified in accordance with example embodiments.
Figure 8B:
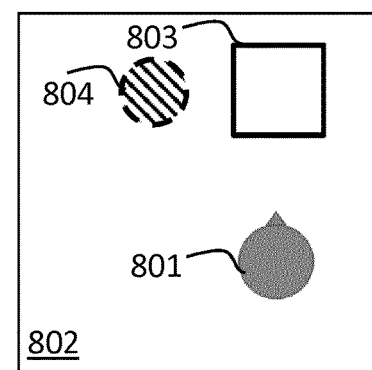

FIGS. 8A and 8B indicate another example embodiment of the above processing operations in use. FIG. 8A indicates a first state at a first time. A user 801 wearing a headset is shown positioned in a physical space 802 when consuming a virtual space. A virtual scene, being a portion of the virtual space corresponding to the field-of-view, is rendered to the headset and includes a virtual object 803 in the form of a person indicated by dashed lines. The person 803 is determined to be in conflict with attributes of the physical space 802 because part of it overlies a physical object 804, for example a chair. The user 801 is therefore prevented from full exploration of the virtual object 803 in the virtual scene because of the chair 804, and the user is at risk from walking into the chair. Referring to FIG. 8B, in accordance with example embodiments, during one or more blinking periods, the virtual object 803 is moved based on the fact that the virtual object is within the user's field-of-view, an example of context. In some embodiments, the virtual object 803 may only be moved if the user 801 moves towards the virtual object 803, which is a different example of context. In some embodiments, the virtual object 803 may only be moved if it is considered an object of interest, for example if it is predicted that the user wishes to interact with the virtual object 803, for example by talking to the virtual person or making a gesture towards it. This is another example of context. In some embodiments, the virtual object 803 may be initially positioned apart from the chair physical object 804.

As in the previous example embodiment, the amount of movement may be such that the user 801 does not, or hardly, notices the movement when rendered to the headset. For this purpose, the amount of movement may be iterative in subsequent blinking periods to minimise user perception. In some embodiments, the amount of movement may be different for subsequent blinking periods and, as will be explained below, the amount of movement may be based on where in the user's field-of-view the conflicting object is located.

The modification may be continued until the conflicting object, i.e. the virtual object 803, is no longer considered conflicting, permitting the user to explore the object in an improved way with minimal perception that they have changed orientation in the physical space 802.

In the above example embodiments, the position of the one or more conflicting objects is modified relative to the remainder of the virtual scene. In other embodiments, the entire virtual scene may be moved.

Modifying the position of the one or more conflicting objects in the virtual scene may be performed differently in each one of a plurality of detected blinking periods. This may be by an amount dependent on the position of the one or more conflicting objects in the field-of-view of the user at the one or more blinking periods. It will be appreciated that the field-of-view can be determined even though the user is blinking or has their eyes shut, based on one or both of the detected position and orientation of the headset. In some example embodiments, the field-of-view just prior to the user blinking may be used.

Figure 9A:
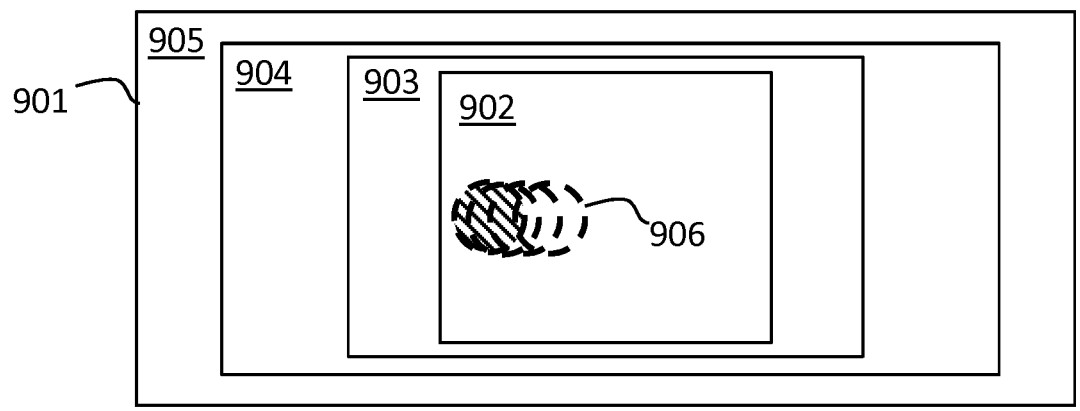
FIGS. 9A and 9B are representational diagrams of a user's field-of-view, arranged into a plurality of zones, within which a virtual object may be detected and modified based on the respective zone in which said object is located, in accordance with example embodiments.
Figure 9B:
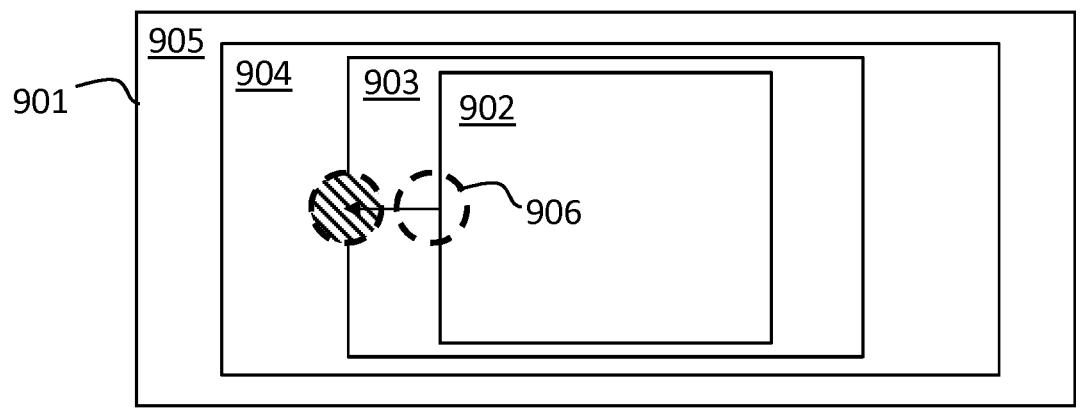

With reference now to FIGS. 9A and 9B, a field-of-view 901 may be divided into two or more zones within which the amount of movement is applied differently, for example to increase movement as a conflicting object becomes further from a central region. For example, the field-of-view 901 may comprise a central zone 902, and one or more outer zones. In the shown example embodiment, a next outer zone 903 may be referred to as the near-peripheral zone. The next outer zone 904 may be referred to as the mid-peripheral zone. The next outer zone 905 may be referred to as the far-peripheral zone, being at the edge of the field-of-view and outside of stereoscopic vision.

The use of rectangular zones in FIGS. 9A and 9B is for ease of explanation, but the field-of-view and the different zones may be represented also by circles or ellipses. The central zone 902 may for example be bounded by a circle (rather than a rectangle) 60 degrees in radius or 120 degrees in diameter, centred about a fixation point.

In some example embodiments, the extent of the field-of-view may be defined in terms of four angles, each measured from a fixation point, i.e. the point at which the user's gaze is directed. These angles, representing four cardinal directions, may be 60 degrees superior (up), 60 degrees nasal (towards the nose), 70-75 degrees inferior (down) and 100-110 degrees temporal (away from the nose and towards the temple). For both eyes, the combined visual field may be approximately 130-135 degrees vertical and 200-220 degrees horizontal. It will be appreciated that the field-of-view may therefore be estimated or determined, for example based on current gaze direction.

Peripheral vision is weak in humans, particularly at distinguishing detail, colour and shape. The density of receptor and ganglion cells in the retina is greater at the centre, and lower at the edges. Moreover, the representation in the visual cortex is smaller than that of the fovea. The distribution of receptor cells across the retina is different between the two main types, i.e. rod cells and cone cells. Rod cells are unable to distinguish colour and peaks in density in the near periphery, while cone cell density is highest in the centre, the fovea, and from thereon declines rapidly as an inverse linear function.

If a conflicting virtual object 906 is detected within the central zone 902, modification may be performed by a relatively small amount to minimise user perception. For each subsequent blinking period, the same or a similar amount of modification may be applied. If the conflicting virtual object 906 is detected with the near-peripheral zone 903, then the amount of modification may be greater, for example to move said object by a greater amount for subsequent blinks. The process is repeated for the mid-peripheral and far-peripheral zones 904, 905 with larger modification amounts, or until the virtual object 906 is no longer conflicting. In some embodiments, the degree of modification may have the opposite relationship, for example with a smaller amount of modification in the far-peripheral zone 95 and a larger amount of modification in the central zone 902.

In some embodiments, rather than distinct zones 902-905, there may be a linear increasing (or decreasing) relationship between the centre of the field-of-view 901 and the outer extent of the field-of-view so that the amount of modification changes accordingly.

There may be provided any number of zones within the field-of-view 901 which represent some form of context and therefore the amount of modification to be applied.

In some example embodiments, the context that determines the modification amount may be dependent on the type of conflicting virtual object. If the conflicting virtual object is one that is moving, or has recently moved, the modification amount may be more than if it is a static or relatively static object. For example, if the conflicting virtual object is a bird, the user may have no absolute understanding as to how fast the bird should be flying and in which direction. Therefore, it may be particularly effective to adapt the speed and direction of the bird in a way that would not be applied to a relatively static virtual object. A virtual object such as a boulder or statue may have less permitted modification in comparison.

In some example embodiments, therefore, the context that determines the modification type and/or amount may be dependent on movement of the conflicting virtual object, including one or more of direction and speed. This may be applied regardless of the type of object.

In some example embodiments, the context that determines the modification amount may be dependent on movement of the user and/or their head as determined by the headset or other position determining means. If the user is moving, more modification may be allowed because then user's capability to detect object movement or speed changes is significantly decreased. If the user is static, the movement may be more limited. The motivation for this is that the user is more likely to notice changes in the scene when the user is static than when the user is moving.

In some example embodiments, in the case of a large virtual object that is positioned close the user so that it appears, for example, both in the user's central field-of-view zone and also the far peripheral zone, the conflicting object may be split into smaller sub-objects which may then be moved according to the above-described operations. For example, if the user is close to a wall with windows and a door, the system may consider the windows and doors as separate objects and move them based on their respective proximity to the user's central field-of-view zone. If the door is more central, then this may be moved less than the windows if located in an outer zone.

In some embodiments, where interaction with a virtual object is desired or predicted, interaction may only be permitted when it is no longer conflicting.

In some embodiments, a virtual object that is conflicting may be shown in a different form than when it is non-conflicting. For example, a conflicting virtual object may be shown using a visual filter, for example a semi-transparent effect filter, which reverts back to its non-filtered form when non-conflicting.

In some embodiments, a virtual object may be placed in the virtual scene corresponding to the position of a real-world attribute to warn the user not to move to the corresponding position. For example, this form of virtual object may be rendered in such a way as to be distinct from other virtual objects, e.g. shown flashing or in a different colour.

Figure 10:
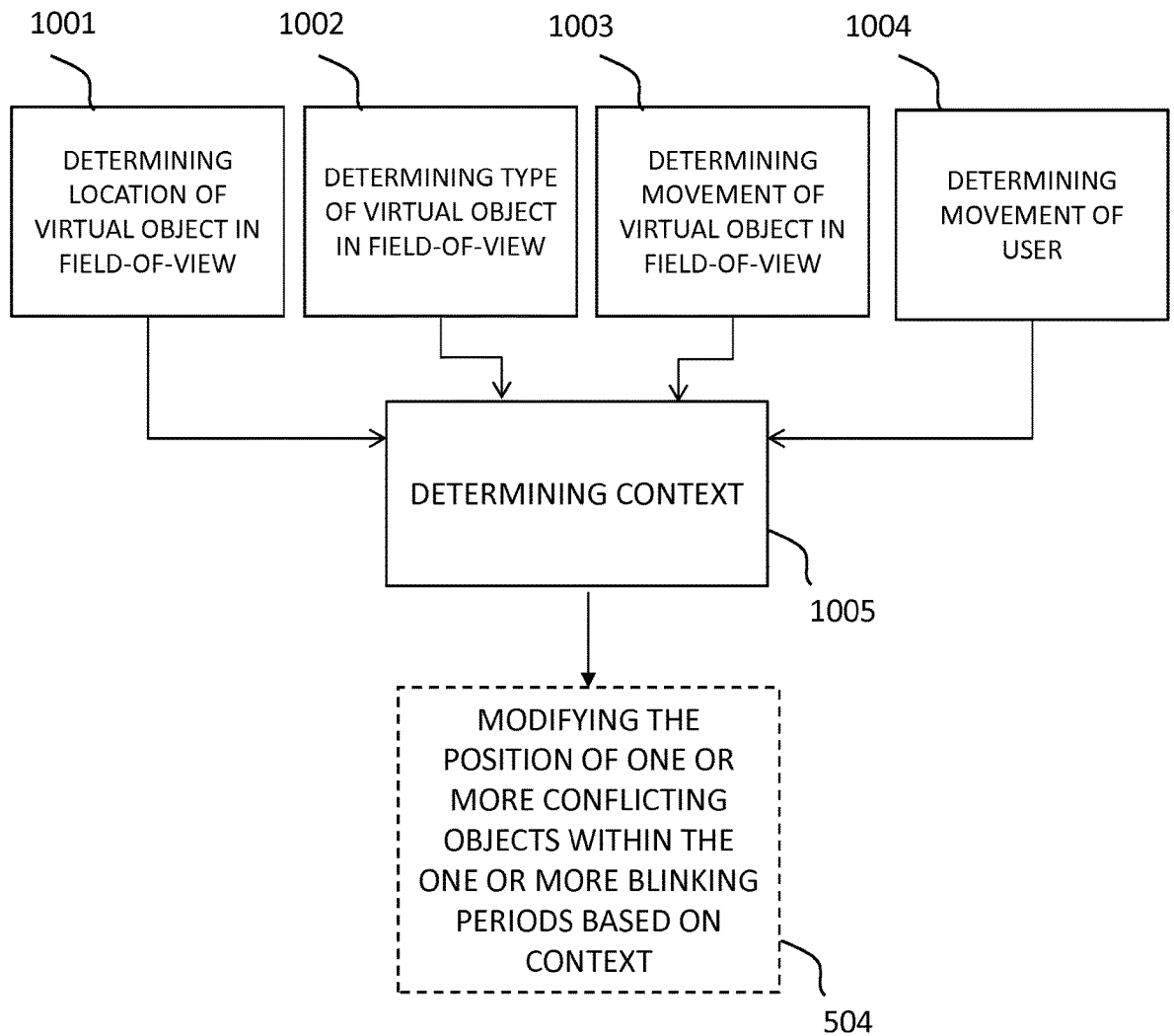
FIG. 10 is a flow diagram showing operations that may be performed by the media player forming part of the FIG. 2 virtual reality display system, in accordance with example embodiments.

FIG. 10 is a flow diagram showing processing operations that may be performed by software, hardware or a combination thereof, as examples of operations performed in the context detection module 604 shown in FIG. 6. For example, the operations may be performed by the software application 468. The order of operations is not necessarily indicative of the order of processing or performance. Not all operations are necessarily performed.

One operation 1001 may comprise determining the location of the virtual object in the field-of-view. Another operation 1002 may comprise determining a type of virtual object in the field-of-view. Another operation 1003 may comprise determining movement of the virtual object in the field-of-view. Another operation 1004 may determine movement of the user. The operations may be performed at each blinking period, or just prior to. One or more of said operations 1001-1004 may be performed individually or in combination and fed to another operation 1005 of determining a context based on data received using said operations and possibly in association with one or more rules, for example which apply a weighting to certain ones of the received data. The determined context in the operation 1005 may provide data to the object modification module 604 shown in FIG. 6, and modification is performed in operation 504 shown in FIG. 5 and indicated in FIG. 10 also, for convenience.

Advantages of the example embodiments include enabling improved exploration of virtual spaces, for example volumetric virtual spaces, with six degrees-of-freedom and reducing the likelihood of accidental collision with objects or walls associated with the physical space within which the user consumes the virtual space.

Where a structural feature has been described, it may be replaced by means for performing one or more of the functions of the structural feature whether that function or those functions are explicitly or implicitly described.

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
   at least one processor; and
   at least one memory including computer program code; the at least one memory and the computer program code configured to, with the at least one processor, cause the apparatus at least to perform:
      rendering a virtual scene of a virtual space that corresponds to a virtual position of a user in the virtual space as determined at least in part by the position of the user in a physical space;
      identifying one or more objects in the virtual scene which are in conflict with attributes of the physical space by determining that the physical space restricts at least one of a movement of the user toward the one or more objects in the virtual scene, or an interaction by the user with the one or more objects in the virtual scene;
      detecting one or more blinking periods of the user when rendering the virtual scene; and
      modifying the position of the one or more conflicting objects in the virtual scene based on a detected context of both the user and the one or more objects, the modifying being performed within the one or more detected blinking periods and being performed differently in a plurality of the one or more detected blinking periods,
   wherein:
      the detected context is determined based on a plurality of operations comprising determining (i) the position of the one or more conflicting objects in the field-of-view of the user, (ii) a type of the one or more conflicting objects in the field-of-view of the user at the one or more blinking periods, and one or both of (iii) movement of the one or more conflicting objects in the field-of-view of the user at the one or more blinking periods or (iv) movement of the user at the one or more blinking periods, and wherein the plurality of operations are performed individually or in combination;
      modifying the position of the one or more conflicting objects in the virtual scene comprises modifying the position of the one or more conflicting objects by (i) an amount dependent on the position of the one or more conflicting objects in the field-of-view of the user during the one or more blinking periods and (ii) an increasing amount in relation to the amount of movement of the one or more conflicting objects or the user during the one or more blinking periods; and
      modifying the position of the one or more conflicting objects in the virtual scene comprises modifying the position of the one or more conflicting objects by an increasing amount in relation to a distance of the one or more conflicting objects from a central region of the field-of-view.

2. The apparatus of claim 1, wherein modifying the position of the one or more conflicting objects in the virtual scene comprises modifying the position of the one or more conflicting objects relative to the remainder of the virtual scene.

3. The apparatus of claim 1, wherein identifying one or more objects in the virtual scene comprises identifying one or more conflicting objects based on their rendered position in the virtual scene at least partially overlying a physical object or barrier in the physical space.

4. The apparatus of claim 1, wherein the at least one memory and the computer program code are further configured to, with the at least one processor, cause the apparatus at least to perform:
   detecting one or more objects of interest within the virtual space, being a subset of a plurality of objects in the virtual space, wherein modifying the position of the one or more conflicting objects in the virtual scene comprises modifying the position of only those of the one or more objects of interest which are in conflict with attributes of the physical space.

5. The apparatus of claim 1, wherein the at least one memory and the computer program code are further configured to, with the at least one processor, cause the apparatus at least to perform:
   temporarily rendering the one or more conflicting objects in a manner which indicates their conflicting status until such time as their position is modified so that they are no longer in conflict.

6. A method comprising:
   rendering a virtual scene of a virtual space that corresponds to a virtual position of a user in the virtual space as determined at least in part by the position of the user in a physical space;
   identifying one or more objects in the virtual scene which are in conflict with attributes of the physical space by determining that the physical space restricts at least one of a movement of the user toward the one or more objects in the virtual scene, or an interaction by the user with the one or more objects in the virtual scene;

detecting one or more blinking periods of the user when consuming the virtual scene; and modifying the position of the one or more conflicting objects in the virtual scene based on a detected context of both the user and the one or more objects, the modifying being performed within the one or more detected blinking periods and being performed differently in a plurality of the one or more detected blinking periods, wherein:
the detected context is determined based on a plurality of operations comprising determining (i) the position of the one or more conflicting objects in the field-of-view of the user, (ii) a type of the one or more conflicting objects in the field-of-view of the user at the one or more blinking periods, and one or both of (iii) movement of the one or more conflicting objects in the field-of-view of the user at the one or more blinking periods or (iv) movement of the user at the one or more blinking periods, and wherein the plurality of operations are performed individually or in combination;

modifying the position of the one or more conflicting objects in the virtual scene comprises modifying the position of the one or more conflicting objects by (i) an amount dependent on the position of the one or more conflicting objects in the field-of-view of the user during the one or more blinking periods and (ii) an increasing amount in relation to the amount of movement of the one or more conflicting objects or the user during the one or more blinking periods; and modifying the position of the one or more conflicting objects in the virtual scene comprises modifying the position of the one or more conflicting objects by an increasing amount in relation to a distance of the one or more conflicting objects from a central region of the field-of-view.

7. The method of claim 6, wherein modifying the position of the one or more conflicting objects in the virtual scene comprises modifying the position of the one or more conflicting objects relative to the remainder of the virtual scene.

8. The method of claim 6, wherein identifying one or more objects in the virtual scene comprises identifying one or more conflicting objects based on their rendered position in the virtual scene at least partially overlying a physical object or barrier in the physical space.

9. The apparatus of claim 6, wherein the modifying position of the one or more conflicting objects in the virtual scene comprises to modifying the position of the one or more conflicting objects by an amount dependent on the amount of movement of the user during the one or more blinking periods.

10. The method of claim 6, further comprising:
detecting one or more objects of interest within the virtual space, being a subset of a plurality of objects in the virtual space, wherein modifying the position of the one or more conflicting objects in the virtual scene comprises modifying the position of only those of the one or more objects of interest which are in conflict with attributes of the physical space.

11. A non-transitory computer readable medium comprising program instructions stored thereon for performing at least the following:
rendering a virtual scene of a virtual space that corresponds to a virtual position of a user in the virtual space as determined at least in part by the position of the user in a physical space;

identifying one or more objects in the virtual scene which are in conflict with attributes of the physical space by determining that the physical space restricts at least one of a movement of the user toward the one or more objects in the virtual scene, or an interaction by the user with the one or more objects in the virtual scene;

detecting one or more blinking periods of the user when consuming the virtual scene; and modifying the position of the one or more conflicting objects in the virtual scene based on a detected context of both the user and the one or more objects, the modifying being performed within the one or more detected blinking periods and being performed differently in a plurality of the one or more detected blinking periods, wherein:
the detected context is determined based on a plurality of operations comprising determining (i) the position of the one or more conflicting objects in the field-of-view of the user, (ii) a type of the one or more conflicting objects in the field-of-view of the user at the one or more blinking periods, and one or both of (iii) movement of the one or more conflicting objects in the field-of-view of the user at the one or more blinking periods or (iv) movement of the user at the one or more blinking periods, and wherein the plurality of operations are performed individually or in combination;

modifying the position of the one or more conflicting objects in the virtual scene comprises modifying the position of the one or more conflicting objects by (i) an amount dependent on the position of the one or more conflicting objects in the field-of-view of the user during the one or more blinking periods and (ii) an increasing amount in relation to the amount of movement of the one or more conflicting objects or the user during the one or more blinking periods; and modifying the position of the one or more conflicting objects in the virtual scene comprises modifying the position of the one or more conflicting objects by an increasing amount in relation to a distance of the one or more conflicting objects from a central region of the field-of-view.

\* \* \* \* \*

UNITED STATES PATENT AND TRADEMARK OFFICE
CERTIFICATE OF CORRECTION

PATENT NO. : 11,386,608 B2
APPLICATION NO. : 16/979794
DATED : July 12, 2022
INVENTOR(S) : Ari-Pekka Liljeroos et al.

It is certified that error appears in the above-identified patent and that said Letters Patent is hereby corrected as shown below:

In the Claims

In Column 19, Claim 9, Line 47, delete "The apparatus" and insert -- The method --, therefor.

Signed and Sealed this
Thirtieth Day of May, 2023

Katherine Kelly Vidal
*Director of the United States Patent and Trademark Office*